United States Patent [19]

Nace

[11] 4,201,153

[45] May 6, 1980

[54] ANIMAL ENCLOSURE SYSTEM

[75] Inventor: George W. Nace, Ann Arbor, Mich.

[73] Assignee: The Regents of the University of Michigan, Ann Arbor, Mich.

[21] Appl. No.: 890,520

[22] Filed: Mar. 27, 1978

[51] Int. Cl.² ............... A01K 61/00; A01K 64/00
[52] U.S. Cl. ......................... 119/3; 119/5; 119/15
[58] Field of Search ............ 119/19, 5, 17, 18, 22, 119/3, 15; 137/577

[56] References Cited

U.S. PATENT DOCUMENTS

| 976,242 | 11/1910 | Wohlfahrt | 119/5 |
|---|---|---|---|
| 3,662,710 | 5/1972 | Pankoke et al. | 137/577 |
| 3,786,781 | 1/1974 | Poulsen | 119/5 |
| 3,924,571 | 12/1975 | Holman | 119/19 |
| 4,084,796 | 4/1978 | Krehbiel | 137/577 |

Primary Examiner—Hugh R. Chamblee
Attorney, Agent, or Firm—Maleson, Rosenberg & Bilker

[57] ABSTRACT

An animal enclosure system comprising an enclosure and a modular assembly of enclosures. Each enclosure is adapted so that environmental conditions may be easily and economically changed and conformed to the particular animal in that enclosure. A selection of different levels for the animal and access means for the animal between levels is provided. An adjustable drain and overflow assembly is provided, adapted to permit easy, selective, accurate and reliable adjustment of the water level in the enclosure and to prevent inundation, even if there is a continuous influx of water. Wet-dry environment balance is carefully controllable.

14 Claims, 13 Drawing Figures

ANIMAL ENCLOSURE SYSTEM

BACKGROUND OF THE INVENTION

1. Field of the Invention

This invention relates to enclosures for animals. More particularly, it relates to enclosures for small animals including amphibians, fish, reptiles and small mammals. Provisions are made for maintaining a plurality of individual enclosures in a modular space-efficient interchangeable system, whereby the environment in each enclosure may be individually adjusted. The particular applicability of this invention lies in the field of experimental investigations involving animals, and its primary interest is toward experimenters with those animals that require a controlled balance between wet and dry environments.

It has applicability to the housing of amphibians which may be strictly aquatic, for example the African clawed toad or the axolotl, or the truly amphibious animals such as the leopard frog and some salamanders and newts, or the primarily terrestrial animals such as toads and some salamanders It is also adaptable for fish, reptiles or small mammals and may be utilized as an aquarium or a terrarium.

In addition to its primary interest to experimenters, it is applicable to education, animal fanciers, dealers, zoos, commercial breeders and the like.

2. Prior Art

No prior enclosures or system of enclosures is known which combines the wide range of advantages of the present invention, and it is believed that all earlier known expedients have certain disadvantages which are overcome by the present invention. Representative earlier U.S. Pat. Nos. of interest include: 2,126,056; 2,524,229; 2,881,733; 3,074,375; 3,127,872 and 3,177,848. Earlier publications include Nace, in BioScience 18:767775, 1968 and Nace, et al in "Guidelines for the Breeding, Care and Management of Laboratory Animals", I.L.A.R. (NAS/NRC), Washington, D.C., and Culley in Lab Animal 5:30-36, 1976.

SUMMARY OF THE INVENTION

This invention relates to an enclosure and a multiple array of enclosures to provide housing for a variety of small animals, including amphibians, fish, reptiles and small mammals. It is particularly characterized in having a high degree of modularity, interchangability, freedom from liter, saving of space, sanitation, and ease of handling. It has particular emphasis on the provision of carefully selectable and adjustable environments. In particular, it has particular emphasis on the adjustment of environment between wet and dry conditions.

A typical enclosure has available a variety of covers to permit different ventilation, light, observation and handling circumstances. These covers can be changed to assimilate changing environments, on an individual enclosure basis.

Each enclosure has provision for and there are provided, a variety of shelves or trays. These shelves or trays may have ramps of different sizes and orientations so that a multi-level environment may be created for the animal, with different conditions prevailing at the different levels. The shelf is provided with a mesh surface for better animal environment.

An important aspect of this invention lies in the provision of an adjustable overflow and drain. This drain assembly is adapted for quick, easy, and positive setting to provide different levels of water in the enclosure. It is also provided for easy disconnect and removal for cleaning. It also has the function of preventing catastrophic undesired rise in water levels which might lead to inundation and drowning. The particular structure of the drain assembly leads to the further sophistication of the system by providing remote adjustment and automatic adjustment of the water levels.

The light, level, wet-dry balance, temperature, ventilation, and other factors are all capable of individual adjustment for each enclosure and capable of cyclical variation, to simulate desired environmental conditions.

DETAILED DESCRIPTION OF THE INVENTION

Figure 2:
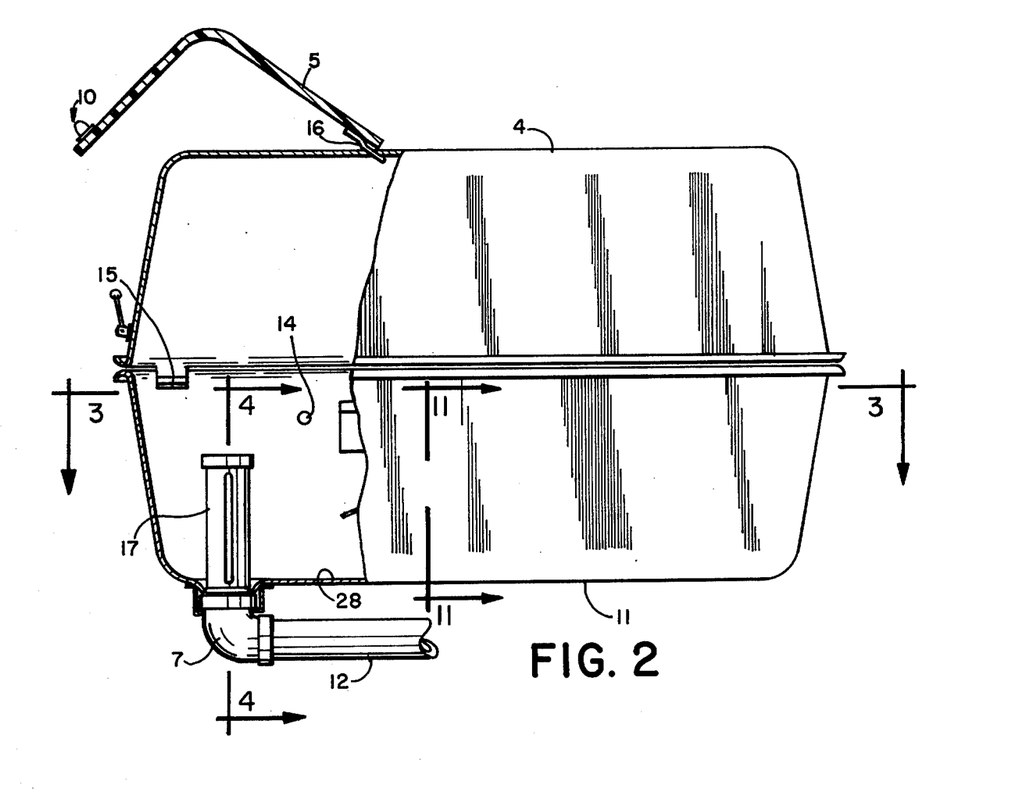
FIG. 2 is a side elevation view, partially fragmented and partially in cross-section, of the enclosure shown at the right hand side of FIG. 1.

The invention can best be initially understood in connection with FIG. 2. FIG. 2 illustrates a typical or representative embodiment of an environmental enclosure for small animals comprising broadly a bottom 11 and a cover 4. The bottom 11 may also be described as a pan and the cover 4 may also be described as a top. In general except as otherwise described, both the top and pan are solid and impervious to water.

The top 4 is not only removeable from the bottom 11, but is interchangeable with other tops that may selectively be provided with certain different characteristics, as will be described. The top 4 is provided with several downwardly depending tabs 15 arranged along the lower edge thereof, which align with corresponding indentations or slots in the upper edge of the pan 11. These interacting tabs and slots prevent lateral relative movement of the pan and the cover. One such lateral movement preventing means is shown in FIG. 2. It is convenient to provide a total of four of these means, symmetrically disposed on the long sides of the enclosure. It is apparent that the fragmentation of FIG. 2 exposes one of these means.

An access door 5 is provided in the cover 4. In FIG. 2, the access door 5 is shown in a raised position; in FIG. 1, the doors 5 and an alternate embodiment of an access door 6 are shown in the closed position.

Figure 1:
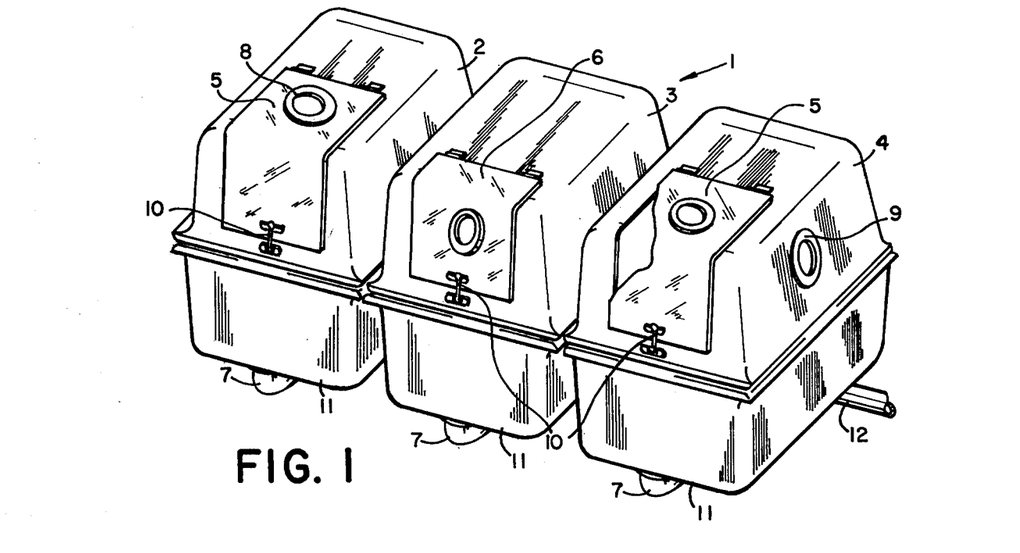
FIG. 1 is a perspective view of a representative portion of a multiple assembly of enclosures, showing several different representative covers and doors.

The door is provided at its lower edge, and the cover 4 is provided at a corresponding place along the edge of the aperture provided for the door, with means which together constitute a door latch 10. In FIG. 1, the latches 10 are shown in the closed, downed, or locked position; in FIG. 2, with the door raised, the latch is shown in its raised, opened or unlatched position. The latch is a simple device, comprising a vertically pivotable rod with an expanded end, on the cover, and a corresponding notch on the bottom 11.

The access door 5 is hinged to the cover 4 with a simple quick-release hinge. In this simplest form, the hinge simply comprises an extension or lip 16, affixed to the surface of the door, extending beyond it, spaced slightly from it on the underside. At the edge of the aperture in the cover 4 may be inserted into the space between the extension 16 and the inner surface of the door 5. The natural resiliency of the materials provides the possibility of the insertion and permits selective removal, and also permits hinged-like movement.

It is apparent that a wide variety of access doors may be provided, in keeping with the spirit of this modular system, to accommodate different animals and different environmental requirements. For example, in FIG. 1, the middle enclosure in the assembly of enclosures is provided with an access door 6 which is substantially smaller in its vertical extension than the access doors 5 as shown in the other two enclosures.

FIG. 1 also is illustrative of other modifications that may be made within the particular spirit of this invention to accommodate different conditions. For example, as illustrated each of the access doors is provided with a port 8. If the material of the enclosure and the doors is not transparent for example, the port 8 may be made of transparent material so as to permit viewing or the admission of light to the interior. In the outermost enclosures as shown in FIG. 1, the ports are on a horizontal surface, whereas in the middle enclosure the port is more nearly vertical. Such differences provide for differences in light admission and viewing angles. In addition, the right hand enclosure in FIG. 1 shows a cover port, located in the cover itself. This illustration is also representative of the variations in environmental conditions and embodiments permitted with the present modular system. The cover port 9 for example need not be provided in other available covers, such as those others illustrated in FIG. 1.

Since the main thrust of advantage of the present invention lies in the provision of enclosures for animals requiring some acquatic condition, the provision of the drain line 12 from each of the enclosures is specifically illustrated. The drain line 12, as shown, communicates to the interior of the enclosure by means of an elbow 7. Further details of the exact connection and its associated structure are described below. In connection with FIGS. 1 and 2, it is sufficient to state that the preferred embodiment is to have a drain line 12 from each enclosure and being manifolded into a main. The continuation of the drain line into a main drain line 12 is shown at the right hand edge of FIG. 1.

Interposed between the interior of the enclosure on one hand and the external drain line 12 and its fittings and connections on the other hand is an adjustable drain overflow pipe assembly 17. This may variously be referred to as the drain, the drain means, the adjustable drain, or the water level adjustment and overflow prevention means 17. It is described in more detail below.

The provision of the trays or shelves in the enclosure whose alternate provision and disposition contributes strongly to the modular spirit of the invention, is best understood in connection with FIGS. 2, 3, and 10-12.

Figure 3:
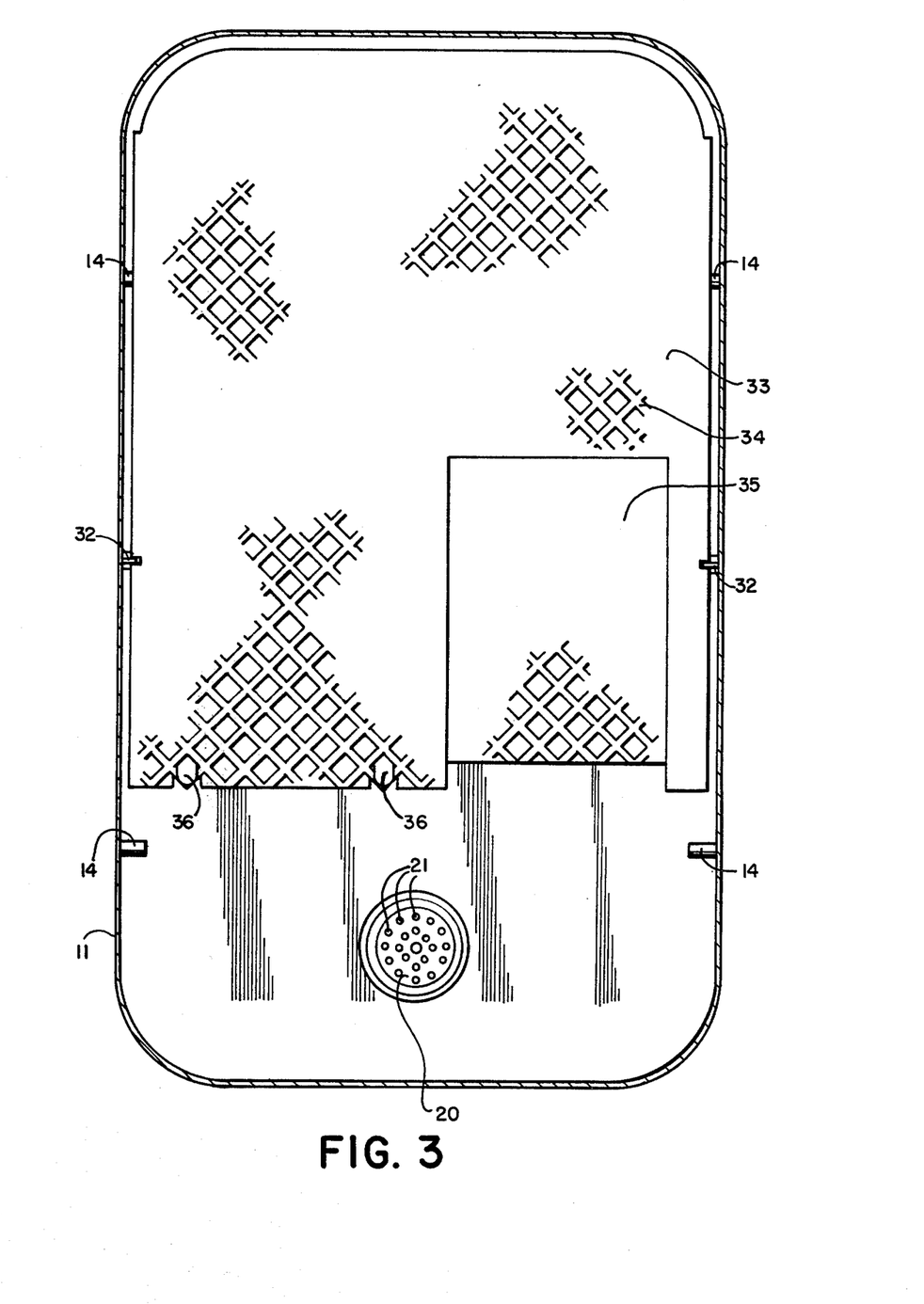
FIG. 3 is a plan view of the enclosure illustrated in FIG. 2, taken along the line 3—3 of FIG. 2.

The fundamental structure of a shelf or tray 33 is best shown in connection with FIG. 3. The inner walls, preferably the longitudinal or long walls, of the bottom 11 are provided with a plurality of inwardly projecting studs or pins 14. In the preferred embodiment, there are two studs 14 on each side of the bottom of the enclosure. As can be seen in FIG. 3, on one side, each stud is mounted the same distance from a respective end or short wall of the bottom portion of the enclosure. Preferably, each stud is positioned closer to the end wall than to the center line between the walls. Each stud is opposed by a corresponding aligned stud projecting inwardly from the other long wall of the bottom enclosure.

In addition, there are a pair of opposed centrally located inwardly projecting indexing means 32. Each of the indexing means 32 provide a support function for a tray 33 similar to that provided by stud 14, but in addition is provided with a vertical extension. This vertical extension is seen from the top in FIG. 3, and its vertical dimension is better shown at reference numeral 32 in FIGS. 12 and 13. The purpose of indexing means 32 is explained below.

Figure 11:
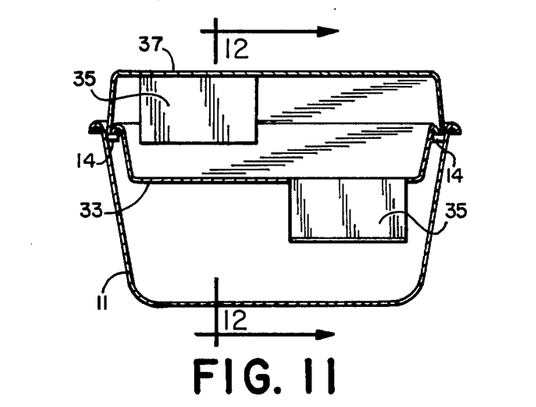
FIG. 11 is a cross-sectional view, taken transversely, of an enclosure provided with an alternate embodiment of a set of trays.
Figure 12:
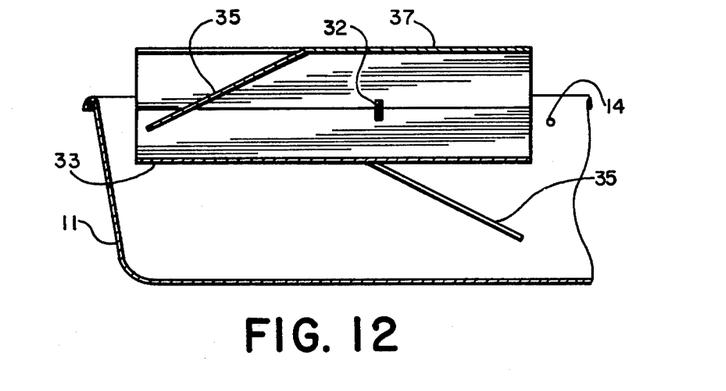
FIG. 12 is a cross-sectional view, partially fragmented, taken along line 12—12 of FIG. 11.

A typical shelf 33 is shown in top or plan view in FIG. 3 and in transverse cross-section in FIG. 11 and longitudinal cross-section in FIG. 12. The main portion of tray 33 comprises a planar solid surface. Near the edges, the surface bends upwardly and then forms an outwardly extending lip, as best shown in FIG. 11. The lip of this portion of tray 33 is dimensioned so as to rest on one of the opposed pairs of pins 14, and also on the centrally located indexing means 32.

A portion of the tray 33, located generally in the planar region, is depressed at an angle to form a ramp 35. This ram 35 extends downwardly toward the bottom surface of the pan 11. Small notches are provided at opposed points along the edge of the shelf 33 so as to align with the indexing means 32 on each side, when the shelf 33 is placed in the pan 11 and rests on one or another of the opposed pairs of pins 14. The surface of the shelves are preferably covered with a flexible mesh 34. The purpose of providing such a mesh is to protect the animals from long-continued contact with the nonporous surface of the tray 33 itself, thus preventing ulceration. The mesh 34 may be secured to the solid surface of tray 33 by means of tray tabs 36, best shown in FIG. 3. These tray tabs 36 are formed by providing small cut outs at an edge of the tray, leaving a projecting tongue. A loop of the mesh is hooked over the tongue, thus securing the mesh to the tray surface.

It will of course be noted, by the consideration even of only the single-shelf arrangement shown in FIG. 3, that the present invention provides an environment for an animal which provides choice. That is, if water is placed in the bottom of pan 11, the animal can remain in an aquatic medium, but can climb ramp 35 to the planar surface of shelf 33 and gain a dry medium. It is of course apparent from FIG. 3 that the shelf 33 may be removed, thus providing a purely aquatic environment, or may be reversed end-to-end, thus placing the ramp at the other end. Even the simple ability to reverse the tray 33 end-to-end permits a choice of environments. For example, if a port 8 is provided near one end, the experimenter has the option of providing the main surface of the tray 33 near to or far from the port 8, and its light admission. The tray 33 is dimensioned so that if it is turned end-to-end in the embodiment shown in FIG. 3, the indexing means 32 still coacts as described, and the other pair of pins 14 is used for the remaining support.

Figure 10:
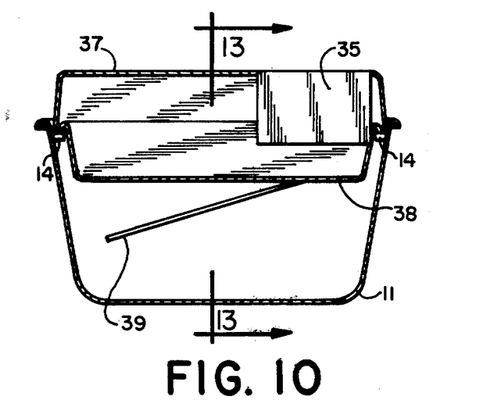
FIG. 10 is a cross-sectional view, taken transversely through an enclosure provided with trays.

FIGS. 10–12 exemplify different types of ramp and shelf geometries and the concept of multiple shelves. These concepts contribute to the modularity of the system and the range of choices available to the experimenter in providing selected and controlled environments for the animals.

FIGS. 11 and 12, in addition to showing tray 33 with its ramp 35, show a multiple tray assembly. A second tray or shelf 37 is provided. The characteristics of the second tray 37 are like those described in connection with tray 33, except where differences are described. One difference is that the planar surface of tray 37 is adapted to be positioned above the pins 14, rather than below the pins 14 as was the case of tray 33. This is done by having the longitudinal side portions of second tray 37 bent so as to extend downwardly. Thus, when the edge of the bent side portions rests on pins 14, the main surface of the second tray 37 is elevated. Tray 37 is also provided with a downwardly extending angled ramp 35. A preferred arrangement of tray 33 and second tray 37 is best shown in connection with FIG. 12. It is seen from this figure that the respective ramps 35 are disposed so as to descend in opposite directions. This permits the animal to climb the ramp 35 on the shelf 33, and then either to remain on shelf 33 or to go to the opposite end and then ascend ramp 35 on second tray 37 and reach the upper most available level. It is apparent that the animal thus has the choice of three horizontal planes, each of which has a different environment. Some obvious differences between the environments of tray 33 and tray 37 are that tray 37 is more remote from water, is not as confined, and (if light admission through the cover is permitted) is lighter than the environment on tray 33. It is also apparent that variations in air circulation and temperature may also be provided at the different levels.

It is noted further that just as a notch or slot was provided on the edge of tray 33 to coact with indexing means 32, a similar notch or slot is provided on the downwardly depending edge of second tray 37, as best shown in FIG. 12. In this figure it is also shown how the vertical extension which comprises part of indexing means 32 extends into the notches on both trays, thus holding them both in alignment against lateral displacement.

Figure 13:
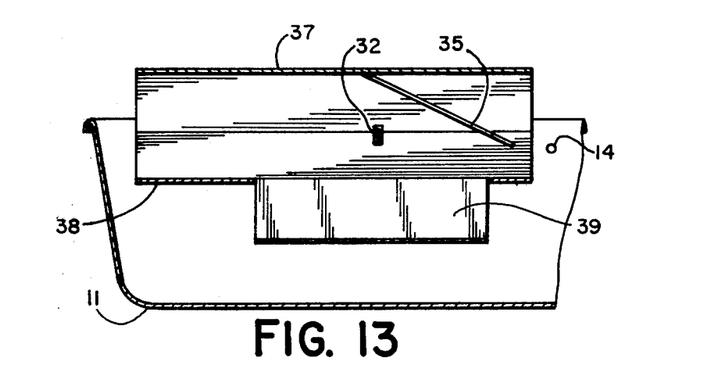
FIG. 13 is a cross-sectional view, partially fragmented, taken along line 13—13 of FIG. 10.

FIGS. 10 and 13 disclose yet another alternate embodiment of arrange of shelves in an enclosure. The characteristics of the shelves and their disposition and coaction with the pan 11 of the enclosure is as has been described above in connection with the other shelves, except where specifically differentiated. A shelf 38 is structured so as to have its planar surface below pins 14 when installed. It is provided with a ramp 39, which has a slope toward one of the long sides of the enclosure bottom 11, rather than toward an end or short side as was the case with the shelves and ramps described in connection with figures 3, 11 and 12. In this embodiment it is also noted that the length or extent of ramp 39 is greater than that of ramp 35. Thus, the experimenter has a choice of wide or narrow ramps. It is understood that there is no strict requirement that a long ramp be used in the longitudinal orientation as shown in FIGS. 10 and 13, but it is apparent that it is advantageous to have the longer overall dimension of pan 11 available where it is desired to use a longer ramp.

In the embodiment shown in FIGS. 10 and 13, a second tray 37 is provided, which has the same characteristics as second tray 37 described in connection with FIGS. 11 and 12. This exemplary showing illustrates how different geometries and orientations of ramps and shelves may be combined. It is apparent that the upper or second tray of the embodiment of FIGS. 10 and 13 could be another longitudinally disposed relatively long ramp 39.

The adjustable drain overflow pipe assembly 17 is best considered in detail in connection with FIGS. 4–9. The structure and operation of this drain makes an important contribution to the usefulness of the enclosure as an atleast partially aquatic medium, for example, by permitting accurately controlled and adjustable levels, prevention of drowning through overflow, and clog resistance.

Figure 4:
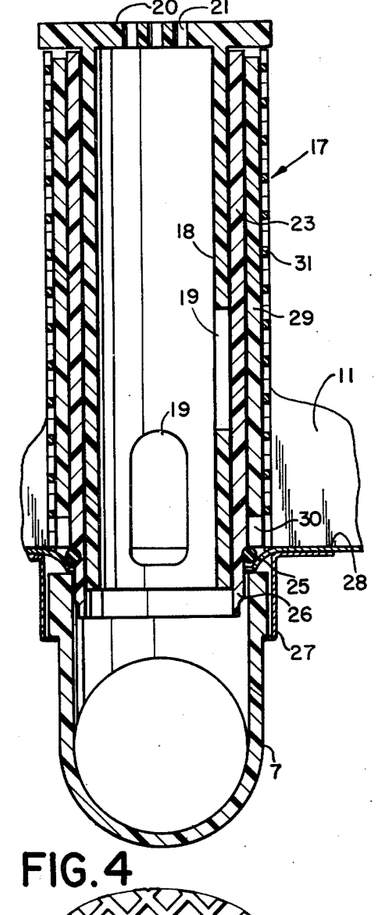
FIG. 4 is a cross-sectional view of the adjustable drain of the enclosure, taken along the line 4—4 of FIG. 2.

The overall structure is best shown in FIG. 4, which is a vertical, longitudinal cross section taken approximately through a diameter of the various concentric tubes. The pipe elbow 7, as previously described, extends upwardly to near the bottom of the pan 11 of the enclosure. For detailed representation of the connecting structure, the bottom surface of pan 11 in this figure is indicated by reference numeral 28. A downwardly extending collar 27 is provided, and is affixed to the external surface of bottom surface 28 as shown. The upper end of elbow 7 is retained within collar 27 by any convenient known means. In FIG. 4, the means of retaining the collar is by inward crimping of the collar, so as to catch under an expansion of the elbow at its upper edge.

Figure 5:
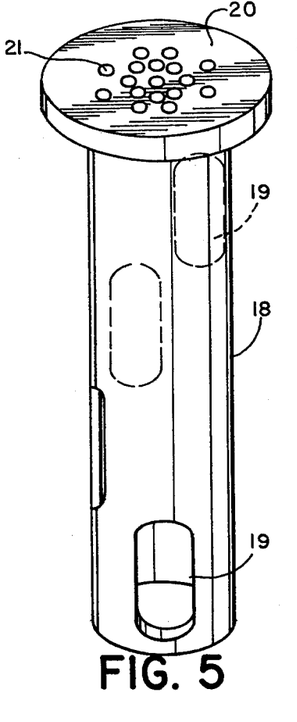
FIG. 5 is a perspective view of the inner tube, rotatable for adjustment, of the drain as illustrated in FIG. 4.

An inner, rotatable adjustment tube 18 is provided. As best shown in FIG. 5, this inner tube is a vertically disposed hollow tube. Broadly speaking, it is provided with opening means whose distance from the bottom edge of the tube is a function of the circumferential location as taken around the tube.

More specifically with reference to FIG. 5 and less generically, the embodiment of FIG. 5 comprises a plurality of openings or windows 19, one of which is as close as structurally possible to the bottom, and the others of which are successively elevated from the bottom as they progress around the circumference of the tube 18, with the highest window 19 being as close as is structurally convenient to the top of the tube. The limitation is that the uppermost and lowermost windows 19 are not vertically aligned. More particularly, the circumferential progress from the lowermost to the uppermost windows is less than 360°. The reason for this is explained below.

The top of the adjustment tube 18 is closed with a top plate 20. The top plate 20 is provided with a plurality of overflow holes 21, which pass through the top plate into the interior of tube 18. This is the innermost tube in the assembly as shown in FIG. 4.

Provided immediately adjacent to and outside tube 18 is fixed tube 23. Fixed tube 23 is provided with an elongated vertical slot 24. Preferably, the width of slot 24 is approximately the same as the width of window 19, the bottom of slot 24 coincides with the bottom of the bottom most window 19, and the top of the slot 24 coincides with the top of the uppermost window 19.

Fixed tube 23 is provided with a resilient O-ring 25, which is retained in a small groove provided for that purpose. This groove is shown in FIG. 4. Fixed tube 23 has a main portion above the O-ring 25, and a diametrically reduced portion 26 below the O-ring 25. As best shown in FIG. 4, the O-ring 25 seats into and tightly against the depressed circumferential portion of a hole in bottom surface 28 provided to accommodate it. The combination of the O-ring 25 and the reduced portion 26, together with the hole 28, provides a sealing seat for fixed tube 23. Fixed tube 23 is not intended for rotation, but it is contemplated that it can be pulled vertically upwardly out of the hole in bottom surface 28. These functions are accomplished by dimensioning the hole, the main and lower portions of the tube 23 and the O-ring 25 so as to provide a snug and water tight sealing fit, which nevertheless can be dislodged by the experimenter pulling firmly upwardly on it.

The fit between inner tube 18 and the fixed tube 23 is such that they have a snug but sliding fit. That is, the fit is such as to be substantially water tight but permitting of manual relative rotation of the tube. Such a fit permits the inner rotatable adjustable tube 18 to be rotated with respect to fixed tubes 23 and to remain in its selected fixed rotational position with a high degree of reliability. It is apparent that by rotating inner tube 18, sequential openings or windows 19 are brought into alignment with slot 24. The alignment of the lowermost window 19 with slot 24 provides an effective opening from outside the tubes to the interior of the tubes at the lowest available level, whereas the alignment of the uppermost window 19 provides such an opening at the highest available level. The intermediate windows provide respectively intermediate effective openings.

The above-described structure permits the setting of the water level in pan 11 at any desired selected level, depending on which window 19 is aligned with slot 24. That is, water will drain out of the pan until its level falls below the lowest portion of the selected window 19. Thus, in FIG. 5, there are four available water levels. Some other functions in the control of water also stem from the structure. For example, suppose that water continually flows into the pan, as is a common environmental procedure. The nominal level is at the lowest point of the selected window 19. If for any reason the flow of water should increase, as by accident, the level starts to rise, and the immediate result is to expose a greater drain cross-section, as the water rises along the window 19, and hence provides a self-correcting greater outflow.

Another structural element of importance is that preferably the lowest point of the lowest window 19 should be below the level of the inner surface of bottom surface 28. This dimensional relationship is shown in FIG. 4. The reason for this is that it will permit a complete draining of the pan 11. It is also noted that there is a slight variation in the shape of the windows 19 as shown in FIGS. 4 and 5. The shape in FIG. 4 is preferable in that the lower edge of the window is configured flater, rather than being rounded off as shown in FIG. 5. The reason for this is that it provides a greater available cross-sectional drain area when the water level is at its very lowest point, so that the draining of the pan 11 may be as complete as possible.

The structure as above described also provides for protection against catastrophic overflow conditions. Suppose that there is a sudden influx of water which cannot be adequately handled by flow through the window 19. Such an overflow can then exhaust from the enclosure through the overflow holes 24. This provides additional protection against accidental drowning or other damage to the animals.

Figure 8:
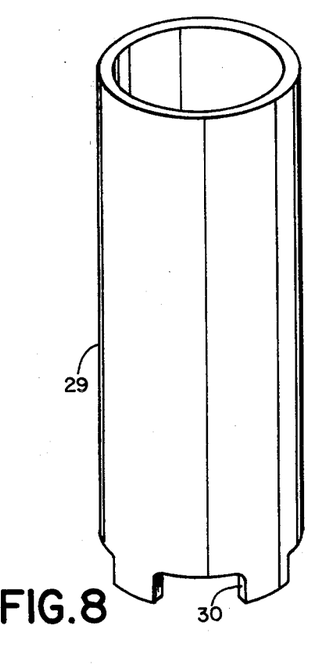
FIG. 8 is a perspective view of the outermost tube (with the exception of the screen) in the adjustable drain as illustrated in FIG. 4; and, FIG. 9 is a perspective view of the middle tube (with the exception of the screen) in the adjustable drain as illustrated in FIG. 4.
Figure 9:
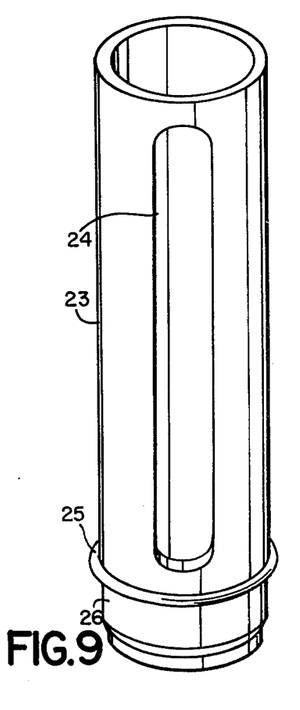

While the drain structure as described immediately above is operative, the preferred embodiment includes certain additional elements. One of these elements is the outer tube 29, as shown in FIG. 8. Outer tube 29 is a hollow vertically oriented tube with no openings except at the top, and as exists at the bottom edge by virtue of the extension of a plurality of legs 30. The space between legs 30 provides openings at the bottom. As shown in FIG. 4, outer tube 29, fits loosely around the outside of the fixed tube 23, with its legs 30 on bottom surface 28. There is enough space between the inner surface of outer tube 29 and the outer surface of fixed tube 23 to permit passage of water. It will be appreciated that with outer tube 29 installed, the drainage of water through the adjustable system takes place from the bottom of pan 11, which is preferable for purposes of cleanliness. That is, water to be drained flows between legs 30 at the bottom, upwardly to the window 19 aligned with slot 24, and thence into the interior of the concentric array of tubes, and out the drain line 12 through elbow 7.

Figure 7:
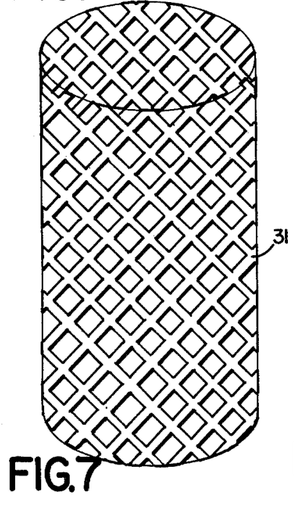
FIG. 7 is a perspective view of the screen in the adjustable drain as illustrated in FIG. 4.

The final element in the drain assembly 17 is a screen 31, as shown in FIG. 7. This vertically oriented cylindrical screen open at top and bottom, is provided around outer tube 29, as shown in FIG. 4, and has the function of screening debris out so as to avoid clogging the drain system.

Figure 6:
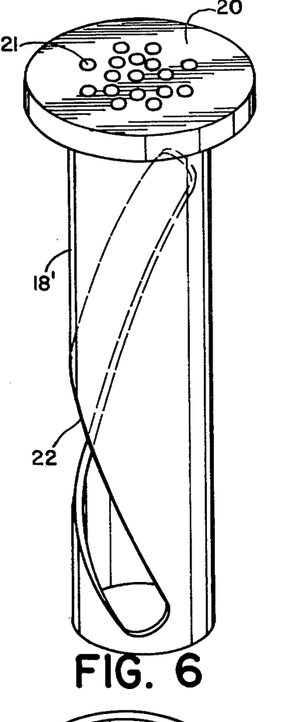
FIG. 6 is a perspective view of an alternate embodiment of an adjustable inner tube of a drain as illustrated in FIG. 4.

An alternate embodiment to the adjustable tube 18 shown in FIG. 5 is shown in FIG. 6. FIG. 6 shows an inner rotational adjustable tube 18' with a top plate 20 and overflow holes 21 as has been described. The generic or broad description of the embodiment of FIG. 6 is the same as that of FIG. 5. More particularly, the plurality of spirally staggered windows 19 of FIG. 5 is replaced by a helically disposed slot 22. The slot 22 may also be described as an opening or window. The lowest portion of slot 22 is as close to the bottom of tube 18' as structurally convenient, and the top is close to the top of tube 18' as is structurally convenient. The elevation of slot 22 above the bottom of tube 18' varies with the circumferential position around tube. The circumferential distance traversed is less than 180°, and the top of slot 22 is not vertically aligned with the bottom of slot 22.

The reason, in connection with the embodiments of both FIGS. 5 and 6, for not having the top and bottom openings coincide or overlap, is so that for each rotational position of tube 18 or 18', there is only one coincidence of window or opening with the fixed slot of fixed tube 23.

The embodiment of FIG. 6 has an advantage over that of FIG. 5 in that it provides a smoothly changeable adjustment of level whereas that of FIG. 5 provides fixed incremental steps. On the other hand, the long curved slot in FIG. 6 tends to produce an impairment of structural stability in the tube. It is contemplated to reinforce the structure of FIG. 6 if necessary, by dividing the length of the slot 22 into halves, by an intermediate bridge, thus producing in effect two elongated helical windows.

Another modification in the drain structure is to provide the screen 31 between the fixed tube 23 and the outer tube 29. In such an arrangement, the screen 31 would serve as a stabilizing spacer between tubes 23 and 29 for the desirable flow passage.

While the discussion has centered around an individual enclosure, it is apparent by reference to FIG. 1 that an important adaptation of the invention lies in the provision of a multiple assembly or array of enclosures. The array of enclosures can be maintained on a rack, which may be formed of prefabricated bolted structural elements or tubes. The enclosures may ride on commercially available slide-arms. These arms form a rectangular frame on which the pans 11 are placed, and may be rolled forward on rollers. This racking structure is not itself illustrated. Note however in connection with FIG. 1 that with the drain line main 12, as has been described, in the position shown, that is, transverse to the alignment of an assembly of enclosures, and located rearwardly, away from the elbow, the following procedure is made possible. Any given enclosure may be pulled forward, as viewed in FIG. 1, on the rack mechanism as has been described, and the drain line 12 may be easily disconnected from the enclosure by a reverse telescoping action. In effect this is due to the right-angle intersection between drain line section 12 as shown in FIG. 2 and the drain line main 12 as shown in FIG. 1.

The organization and structure of this invention is described and permits the addition artificial plants in the enclosure. This may be done by providing vertical tubes at the edge of the shelves or trays 33, into which plants are inserted. This is useful for example in breeding tree frogs which lay their eggs on leaves which then drop into the water.

Several different types of covers or tops 2, 3 and 4 have been shown and described. It is part of the modular advantage of this invention that a wide variety of tops having different environmental characteristics may be provided. Thus, the top floor may be a completely transparent plastic, or, at the other extreme may be completely opaque. It may be provided with or without access doors of various sizes and with or without ports. The ports may be screened or may be viewing or light admitting ports. The possibility of carefully controlled light is important in the care of certain animals, for example in changing their environment from winter to summer conditions. This in turn is important in encouraging breeding. This present invention permits the control to be made on an enclosure by enclosure basis.

It is possible and is contemplated within the spirit of this invention to provide manifolded water supply to all of the enclosures, generally including a constant flow of water into each enclosure. It is also contemplated as a possibility to provide separate forced air ventilation with a manifolded system to produce a positive pressure in the enclosure. This results in each enclosure having its air supply coming from a controlled source, with the flow of possibly contaminated air always outwardly from the enclosure and not entering any other enclosure. Each enclosure may be provided with its own air thermostat and water thermostat and associated heaters, to further control the exact environment.

It is apparent that the drain 17 as has been described permits selection of the water level in each enclosure, and it is also apparent that the experimenter may change these levels at will. Since the adjustment of the adjustable drain overflow pipe assembly is made by rotation of the top plate 20, index markings may be placed on this plate so that the experimenter is provided with immediate quantitative information as to the water level. The edge of the top plate may be knurled to provide a better grip for turning. It is also possible to provide automatic or motorized means to selectively rotate the top plate 20 to change the water level in a given enclosure. For example, a timer may operate through a relay and energize an indexing or stepping motor operatively connected to the top plate 20, to rotate it one way or ther other at various times, possibly in a circadian cycle.

Some animals require a cyclical rise and fall of water level, usually tide water animals, such as crabs, barnacles and muscles. Instead of moving the top plate in discrete increments, a motor may be provided with an extreme geared down ratio to slowly constantly rotate the top plate to more closely simulate tidal progression.

It is also possible within the spirit of this invention to provide an upwardly extending operating rod, fixed to the center of top plate 20, so that the operator may rotate top plate 20 without reaching down low into the enclosure. It is also apparent of course that other environmental materials such as sand or soil may be included in the enclosure.

The elements of the enclosure and the drain may be made of any appropriate materials, with due regard to non-toxicity to the animals. For example, plastics may be used. One such plastic, particularly suitable for the drain assembly is polycarbonate resin, such as is available under the trademark Lexan. The cover 4 and pan 11 of the enclosure may be made of plastic or may be made of stainless steel, by way of example. It is apparent that the different manufacturing processes peculiar to steel on one hand and plastic on the other, will result in slightly different appearances. For example, the studs or pins 14 if molded integrally with the pan 11, will have a characteristic shape suitable to the molding process, whereas if the pan 11 is made of stainless steel, it might be more common to provide the studs 14 by punching through from the exterior, to make an inwardly extending tongue. It is apparent that this would have the same functional effect.

Some of the basic principles involved are the provision of a wide range of options for environment with the initial emphasis on control of the balance between dry and wet environments, but also including light, ventilation and heat conditions. The system permits great interchangability of parts and rapid disassembly. Note that sharp corners are eliminated to prevent hazards to the animals' personnel. The general concept makes it convenient to have the enclosures free of undesired openings. Maximum isolation to prevent the spread of infectious agents and stress-producing external circumstances is provided. The sanitary conditions are improved. There is careful control of water supply permitting recycling or one-time use. There is great flexibility in handling different populations of unique character. Husbandry labor is minimized, and litter and floor space are minimized. There is good access to the animals and to the parts to be serviced.

The size of the enclosures may vary. For example only, the depth of the bottom pan 11 may be 4, 5 or 6 inches nominally. The length of the enclosure may be on the order of 21 inches nominally.

In addition to aquatic animals, it is apparent that this system may be used by reptiles, or terrestrial animals such as gerbils, or ground squirrels. Such animals desire a substrate of soil for burrowing. A moist base can be provided with this invention in such a substrate.

I claim:

1. An animal enclosure comprising a pan having a bottom surface and sides, a top having an upper surface and sides, said top being configured to coincide with said pan, said top being selectively removeable from said pan, a drain extending from the interior of said pan to an external drain line, said pan being adapted to receive and retain against lateral movement a selective plurality of shelves, said shelves being at different levels with respect to each other, and being provided with means for animal access from one said shelf to another and to the said bottom surface of said pan, said means to receive and retain said shelves including a plurality of studs and a plurality of indexing means, each of said studs at least partially supporting one shelf, when a shelf is positioned over said stud, and each indexing means coacting with a portion of one shelf when a shelf is positioned adjacent said indexing means, to prevent lateral movement of said shelf.

2. An animal enclosure as set forth in claim 1 each of said shelves comprises a main generally planar horizontal surface, and a ramp, said ramp extending from said horizontal surface at a vertical angle thereto, said ramp providing means of access of an animal in said enclosure to said main surface, from a surface at another level.

3. An animal enclosure as set forth in claim 2 wherein one surface of said shelf, including the main planar horizontal surface and the ramp, is covered with a mesh, separable from said shelf.

4. An animal enclosure as set forth in claim 2 wherein a plurality of tops are provided, each of said tops being configured to coincide with said pan, each of said tops being selectively engageable with said pan, said tops having variable selections of transparent and opaque portions, doors, and ventilation portions.

5. An animal enclosure as set forth in claim 2 wherein said shelf has a side portion depending at an angle from said main planar horizontal portion, the edge of said side portion remote from said main planar portion being dimensioned and configured to rest on at least some of said studs and to engage at least some of said indexing means.

6. An animal enclosure as set forth in claim 5 wherein there are at least two said shelves, each of said shelves being at a different level than the other, the lowermost of said shelves being provided with a ramp that provides animal access from said bottom surface of said pan to the surface of said lowermost shelf, and the upper shelf being provided with a ramp that provides access from an animal from the lowermost shelf to the upper shelf.

7. An animal enclosure set forth in claim 6 wherein said lowermost shelf has the major portion of said planar horizontal surface toward one end of said pan, and said ramp extending toward the other end of said ramp, and said upper shelf is positioned so that its said ramp descends toward said lowermost shelves at the end thereof remote from that end of said lowermost shelf that is provided with a ramp.

8. An animal enclosure as set forth in claim 6 wherein one of said shelves is provided with a ramp that descends toward and end of said pan, and another of said shelves is provided with a ramp that descends toward a side of said pan.

9. An animal enclosure as set forth in claim 2 wherein said drain is adjustable to set a desired water level in the bottom of said pan, said drain comprising a fixed tube and a selectively rotatable adjustment tube, said adjustment of said water level being made by the relative rotation of said tubes.

10. An animal enclosure as set forth in claim 9 wherein said adjustable tubes provided with opening means whose distance from the bottom edge of said tube is a function of the circumferential location of said opening means around said tube.

11. An animal enclosure means as set forth in any of claims 1, or 2 or 5 wherein there is a plurality of said enclosures, said plurality of enclosures being arranged in an array, said drains from each of said enclosures being manifolded to a drain line main, at least some of said enclosures being arrayed in side-by-side relationship, with said drain communicating to the interior of each said pan of each said enclosure near the front thereof, and being connected to the drain line main, said drain line main running transversely to said array of side-by-side enclosures near the ends thereof most remote from said drain.

12. An adjustable drain and overflow assembly adapted for communicating an external drain line to the interior of a pan, said drain having means rotatably adjustable to selectively chose a lowest opening from the interior of said pan to said drain line at a desired level and having means to prevent an overflow condition if the influx of liquid into said pan is greater than the capacity of said opening to discharge said liquid into said drain line;

said drain comprising a rotationally adjustable hollow vertically aligned tube and a fixed hollow vertically aligned tube, said rotationally adjustable tube including opening means whose distance from the bottom edge of said tube as a function of the circumferential location as taken around said tube, said opening extending less than 360° of the circumference of said tube, and the bottom-most portion of said opening being non-coincident with the top most portion of said opening;

said fixed tube being provided with a vertically aligned elongated slot, an outermost tube, said outermost tube having a solid cylindrical surface except for spaced defined between legs at the bottom thereof, and spaces to permit the passage of liquid being provided between the inner surface of the outermost tube and the tube to which it is adjacent, all of said tubes being concentric, whereby the flow of liquid from said pan is taken from the bottom of said pan.

13. A drain as set forth in claim 12 wherein an additional cylindrical member is concentrically provided with said other tubes, said additional member being a screen.

14. A drain as set forth in claim 13 wherein said fixed tube is provided with a reduced diameter portion at the bottom end thereof, and carries a resilient O-ring above said bottom portion, said O-ring seating firmly against the bottom surface of said pan.

* * * * *